United States Patent
Hijazi et al.

(10) Patent No.: US 9,752,476 B2
(45) Date of Patent: Sep. 5, 2017

(54) APPARATUS FOR SIZING A COMPONENT SHELL HAVING AT LEAST TWO DIFFERENT CROSS-SECTIONS

(71) Applicant: Faurecia Emissions Control Technologies, USA, LLC, Columbus, IN (US)

(72) Inventors: Claudinei Hijazi, Bargersville, IN (US); John Warren, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 247 days.

(21) Appl. No.: 14/708,329

(22) Filed: May 11, 2015

(65) Prior Publication Data

US 2016/0333758 A1    Nov. 17, 2016

(51) Int. Cl.
*F01N 3/021* (2006.01)
*B23P 19/00* (2006.01)
(Continued)

(52) U.S. Cl.
CPC ............ *F01N 3/0211* (2013.01); *B23P 19/00* (2013.01); *F01N 3/2842* (2013.01);
(Continued)

(58) Field of Classification Search
CPC .... F01N 3/0211; F01N 3/2842; F01N 13/008; F01N 3/2853; F01N 2560/025;
(Continued)

(56) References Cited

U.S. PATENT DOCUMENTS 5,329,698 A * 7/1994 Abbott ................. F01N 3/2857
                                                          29/890
5,724,735 A * 3/1998 Ickes ..................... F01N 3/2857
                                                          29/515
(Continued)

FOREIGN PATENT DOCUMENTS

DE         10254036 A1    6/2004
WO         9932215        7/1999
(Continued)

OTHER PUBLICATIONS

International Search Report and Written Opinion for International Application No. PCT/US2016/029413 mailed Aug. 24, 2016.

*Primary Examiner* — Sarang Afzali
(74) *Attorney, Agent, or Firm* — Carlson, Gaskey & Olds, PC

(57) ABSTRACT

A method and apparatus forms an exhaust component that includes first and second substrates. An outer shell surrounds the first and second substrates. At least one sensor hole is formed in the outer shell at a location between the first and second substrates. A first end of the outer shell is surrounded with a plurality fingers to size the first end around the first substrate to a first diameter. The plurality of fingers includes an extended finger that is longer than the other fingers such that the extended finger at least partially covers the sensor hole during sizing of the first end. A second end of the outer shell is then surrounded by the fingers to size the second end around the second substrate to a second diameter. The extended finger at least partially covers the sensor hole during sizing of the second end.

6 Claims, 1 Drawing Sheet

(51) Int. Cl.
 *F01N 3/28* (2006.01)
 *F01N 13/00* (2010.01)
 *B23P 15/00* (2006.01)

(52) U.S. Cl.
 CPC ......... *F01N 3/2853* (2013.01); *F01N 13/008* (2013.01); *B23P 15/00* (2013.01); *F01N 2560/025* (2013.01)

(58) Field of Classification Search
 CPC .... B23P 19/00; B23P 15/00; Y10T 29/49398; Y10T 29/53796; Y10T 29/53843; Y10T 29/53943
 See application file for complete search history.

(56) References Cited

U.S. PATENT DOCUMENTS

| | | | |
|---|---|---|---|
| 6,389,693 | B1 | 5/2002 | Aranda et al. |
| 6,769,281 | B2* | 8/2004 | Irie .................. F01N 3/2853 29/890 |
| 7,823,285 | B2 | 11/2010 | Cai et al. |
| 8,225,476 | B2* | 7/2012 | Mayfield ............. B23P 11/005 29/283.5 |
| 8,590,152 | B2* | 11/2013 | Cantele ............... F01N 3/0211 29/407.05 |
| 8,661,672 | B2* | 3/2014 | Cantele ............... F01N 3/0211 29/890 |
| 8,795,598 | B2 | 8/2014 | Lawrukovich |
| 2002/0057998 | A1 | 5/2002 | Foster et al. |
| 2006/0150382 | A1* | 7/2006 | Martin .................. B23P 19/04 29/281.3 |
| 2008/0070169 | A1 | 3/2008 | Ingalls et al. |
| 2010/0143210 | A1 | 6/2010 | Kim |
| 2015/0290698 | A1* | 10/2015 | Sojak ................... B21D 15/02 29/890.08 |

FOREIGN PATENT DOCUMENTS

| | | |
|---|---|---|
| WO | 03027455 | 4/2003 |
| WO | 2009059427 A1 | 5/2009 |

* cited by examiner

APPARATUS FOR SIZING A COMPONENT SHELL HAVING AT LEAST TWO DIFFERENT CROSS-SECTIONS

TECHNICAL FIELD

The subject invention relates to a method and apparatus for sizing an exhaust component shell having at least two different diameters. More specifically, the subject invention relates to sizing a converter shell having a sensor hole located between shell portions having different diameters.

BACKGROUND OF THE INVENTION

A vehicle exhaust system includes various components that transmit exhaust gases generated by a combustion engine to an ambient outlet. One such exhaust component is a catalytic converter that includes an outer shell defining an internal cavity that receives a catalyst substrate. The catalyst substrate can be formed as a single piece or can be separated into multiple pieces which are referred to as "bricks." Typically, the substrates are wrapped with an insulating material, e.g. an insulation mat, to reduce heat radiation to adjacent components in a vehicle underbody, and to retain or support the substrate in the shell.

During vehicle operation, sensors are often used to monitor certain catalytic converter characteristics. For example, the catalytic converter often includes an oxygen sensor. The oxygen sensor is attached to a sensor boss that is installed on the outer shell. In one known configuration, the sensor boss is attached to an outer shell that surrounds a pair of substrates received within the internal cavity.

Typically, the method for manufacturing this type of converter configuration includes measuring the substrates, weighing the mats, wrapping the mats around the substrates, and inserting the wrapped substrates into a cylindrical outer shell. The shell is then sized, such as by reducing a diameter of the shell, to a desired diameter based on the measured substrate and mat weight characteristics. Prior to the stuffing step, a hole is typically punched into the outer shell at a location between the substrates, and a sensor boss is attached to surround this hole after the sizing process is completed. Typically, the sensor boss is welded to the outer shell about the hole location.

In certain configurations, the outer shell has to be sized to two different diameters to compensate for component tolerance variation. For example, one end of the shell that surrounds one substrate may be required to be sized to a smaller diameter than an opposite end of the shell that surrounds the other substrate. Traditional sizing operations for this type of configuration provide a poor weld area around the sensor hole. The differing diameters can result in large gaps between the boss and the shell at discrete circumferential locations, which is undesirable.

SUMMARY OF THE INVENTION

In one exemplary embodiment, a method for forming an exhaust component includes the following steps: providing at least a first substrate and a second substrate; providing an outer shell that surrounds the first and second substrates, the outer shell defining a center axis; forming at least one sensor hole in the outer shell at a location between the first and second substrates; surrounding a first end of the outer shell with a plurality fingers to size the first end around the first substrate to a first diameter, wherein the plurality of fingers includes at least one extended finger that is longer than the other fingers such that the extended finger at least partially covers the sensor hole during sizing of the first end; and surrounding a second end of the outer shell with the plurality fingers to size the second end around the second substrate to a second diameter, wherein the extended finger at least partially covers the sensor hole during sizing of the second end.

In a further embodiment of the above, the method includes aligning the extended finger to at least partially cover the sensor hole during sizing of the first end to provide a first surface around one side of the sensor hole that is sized to the first diameter.

In a further embodiment of any of the above, one of the first and second diameters is greater than the other of the first and second diameters.

In a further embodiment of any of the above, the method includes removing the first end of the outer shell from the plurality of fingers, rotating the outer shell such that the plurality of fingers surround the second end of the outer shell, aligning the extended finger to at least partially cover the sensor hole during sizing of the second end to provide a second surface around an opposite side of the sensor hole that is sized to the second diameter.

In another example embodiment, the plurality of fingers comprises a first set of fingers and a second set of fingers, each of the first and second sets of fingers including at least one extended finger, and the method further includes sizing the first end of the outer shell to the first diameter with the first set of fingers, and sizing the second end of the outer shell to the second diameter with the second set of fingers.

In a further embodiment of any of the above, the method includes attaching a sensor boss to the outer shell at the sensor hole.

In a further embodiment of any of the above, the first substrate has a first substrate diameter and the second substrate has a second substrate diameter greater than the first substrate diameter, and the method further includes wrapping the first substrate with a first mat and wrapping the second substrate with a second mat prior to inserting the first and second substrates into the outer shell.

In a further embodiment of any of the above, the method includes measuring the first and second substrate diameters prior to wrapping the first and second substrates with the first and second mats.

In a further embodiment of any of the above, the method includes weighing the first and second mats prior to wrapping the first and second mats around the first and second substrates.

In a further embodiment of any of the above, the method includes sizing the first end of the outer shell to the first diameter based on a measured diameter of the first substrate and weight of the first mat, and sizing the second end of the outer shell to the second diameter based on a measured diameter of the second substrate and weight of the second mat.

In another exemplary embodiment, an apparatus is provided for sizing an exhaust component having an outer shell defining a center axis extending from a first shell end to a second shell end, a first substrate positioned within the internal cavity at the first shell end, a second substrate positioned within the internal cavity at the second shell end, and at least one sensor hole formed in the outer shell between the first and second substrates. The apparatus includes a base coupled to an actuator and a plurality of discrete fingers to surround the first shell end to size the outer shell about the first substrate to a first diameter. The fingers surround the second shell end to size the outer shell about the second substrate to a second diameter, wherein the fingers extend axially from the base and are circumferentially spaced apart from each other about the central axis. The fingers are defined by an axial length that extends from the base to a distal finger end, and wherein at least one finger has a longer axial length than the other fingers.

In a further embodiment of any of the above, the at least one finger comprises only one finger having a longer axial length than the other fingers.

In another example embodiment, the plurality of fingers comprises a first set of fingers and a second set of fingers, each of the first and second sets of fingers including at least one extended finger, and wherein the first end of the outer shell is sized to the first diameter with the first set of fingers, and the second end of the outer shell is sized to the second diameter with the second set of fingers.

These and other features may be best understood from the following drawings and specification.

DETAILED DESCRIPTION

Figure 1:
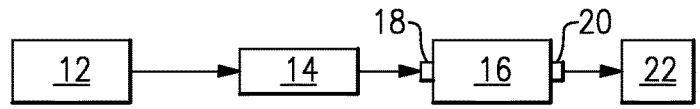
FIG. 1 is a schematic representation of a vehicle exhaust system with a catalytic converter incorporating the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalytic converters, mufflers etc. In one example configuration, the upstream exhaust components 14 direct exhaust gases into a catalytic converter 16 having an inlet 18 and an outlet 20. The outlet 20 communicates exhaust gases to downstream exhaust components 22. The various downstream exhaust components 22 can include one or more of the following: pipes, filters, valves, mufflers etc. These upstream 14 and downstream 22 components can be mounted in various different configurations and combinations dependent upon vehicle application and available packaging space.

Figure 2:
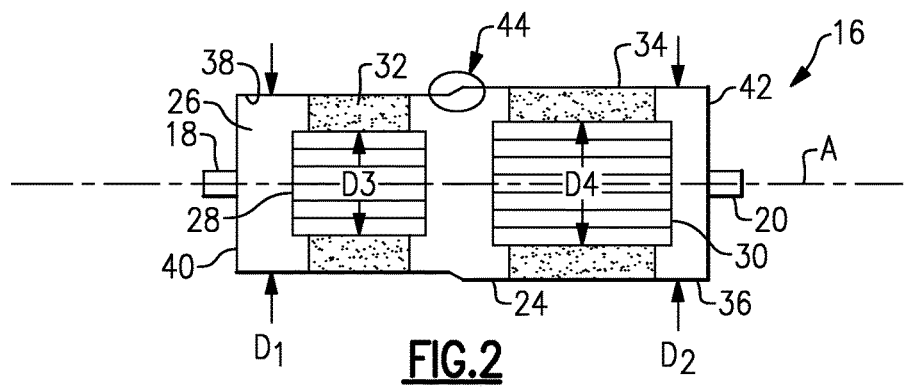
FIG. 2 is a schematic representation of the catalytic converter including two substrates and an outer shell sized to two different diameters.

As shown in FIG. 2, the converter 16 has an outer shell 24, also referred to as a can, which defines an internal cavity 26. In the example shown in FIG. 2, the catalytic converter 16 includes at least a first substrate 28 and a second substrate 30. The catalyst substrates 28, 30 are received within the internal cavity 26. As known, the catalyst substrate is a substance that speeds up a chemical reaction rate. In an automotive exhaust application, the catalyst substrate comprises an inert substance onto which an active wash coat is added. The catalyst substrate speeds up oxidation of unconverted hydrocarbons and carbon monoxide into water and carbon dioxide. The materials used for the inert substance and active wash coat, and the operation of a catalytic converter is well known and will not be discussed in further detail.

A first mat 32 surrounds the first substrate 28 and a second mat 34 surrounds the second substrate 30. The mats 32, 34 are compressed between the outer shell 24 and the respective substrates 28, 30 during sizing of the outer shell 24, which will be discussed in greater detail below. The outer shell 24 includes an external surface 36 and an internal surface 38 that defines the internal cavity 26. The mats 32, 34 are compressed directly against the internal surface 38, and provide insulation and help reduce noise. Any type of insulating mat material known in the art could be used for mats 32, 34. The mats 32, 34 are preferably wrapped around the catalyst substrates 28, 30.

Figure 3:
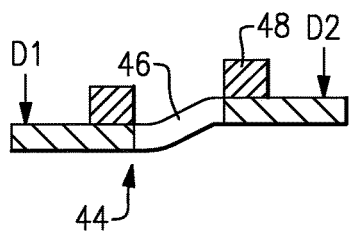
FIG. 3 is a schematic representation of a sensor hole formed in the outer shell at a location between the two substrates.

The outer shell 24 defines a central axis A that extends from a first end 40 to a second end 42. In an area 44 on the outer shell 24 at a location between the first 28 and second 30 substrates, at least one sensor hole 46 (FIG. 3) is formed. In the example shown, the sensor hole 46 has a circular shape. However, any other hole shapes could also be used such as oval, square, rectangular, etc.

A sensor boss 48 is attached to the outer shell 24 and extends outwardly from the external surface 36. Typically, the sensor boss 48 is welded directly to the outer shell 24. The sensor boss 48 can be used for any type of exhaust sensor; however, the sensor boss 48 is preferably used for an oxygen sensor (not shown). The exhaust sensors are used to measure and monitor catalytic converter operating characteristics as needed. The operation of exhaust sensors, such as an oxygen sensor, is well-known and will not be discussed in further detail.

In one example configuration, the first end 40 of the outer shell is sized to a first diameter D1 around the first substrate 28 and the second end 42 is sized to a second diameter D2 around the second substrate 30 where the second diameter D2 is greater than the first diameter D1. The sensor hole 46 is formed by a punching operation, for example, prior to the stuffing the first 40 and second 42 ends. Typically, the area 44 in which the hole 46 is formed has a very short axial length between the two substrates 28, 30. In such a configuration, this area 44 around the sensor hole 46 will deform to a certain extent during the sizing operations resulting in different diameters on opposite sides of the hole 46. This makes it difficult to weld the sensor boss 48 to the outer shell 24. Often, a large gap will be formed at one side of the hole 46 which is undesirable. The subject invention provides a method and apparatus for sizing the outer shell 24 to provide a better welding area around the sensor hole 46.

As discussed above, the outer shell 24 surrounds the first and second substrates 28, 30, which are wrapped in the first 32 and second 34 mats, respectively. The substrates 28, 30 can have variable diameters and the mats 32, 34 can have variable weights. In the example shown, the first substrate 28 has a first substrate diameter D3 and the second substrate has a second substrate diameter D4 greater than the first substrate diameter D3. The diameters D3 or D4 could be the same with varying dimensions possibly caused by differences in the mats 32, 34. Further, any difference that does exist between the diameters D3, D4 is very small due to component tolerance variation. The difference is exaggerated as schematically shown in FIG. 1 solely for discussion purposes.

The degree of sizing of the first 40 and second 42 ends is determined based on characteristics of the components located within the outer shell 24. For example, these characteristics can be related to specific component characteristics of the substrates and/or mats, or of other components located within the outer shell. In one example, the diameter of the substrates and the weight of the mats is used. This example is described in greater detail below.

In one example method of manufacturing the converter 16, the sensor hole 46 is formed in the outer shell, the diameters of the substrates 28, 30 are measured, and the mats 32, 34 are weighed. After, these steps are taken, the first mat 32 is wrapped around the first substrate 28 and the second mat 34 is wrapped around the second substrate 30. Next, the wrapped substrates 28, 30 are stuffed into the outer shell 24. The shell 24 has at least one sensor hole 46 punched into the shell 24 at a location between the substrates 28, 30 prior to the stuffing step.

A first end 40 of the shell 24 is then sized to the first diameter D1 based on the measured diameter of the first substrate 28 and the weight of the first mat 32. The first end 40 refers to the portion of the outer shell 24 that surrounds at least the first substrate 28.

Figure 4:
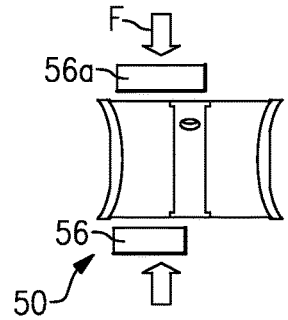
FIG. 4 is schematic representation of a tool used to size the outer shell.
Figure 5:
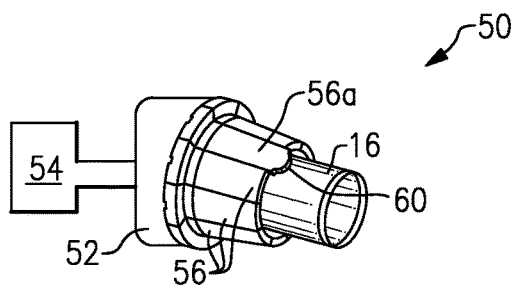
FIG. 5 is a perspective view of the tool showing a plurality of fingers including one extended finger.
Figure 6:
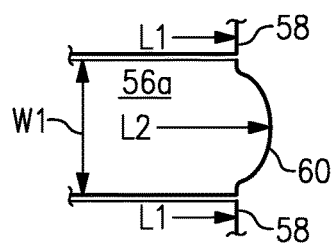
FIG. 6 is a top view of a distal end of the extended finger in relation to the sensor hole.

As shown in FIGS. 4-6, the sizing process utilizes a sizing tool 50 having a base 52 coupled to an actuator 54. A plurality of circumferentially spaced fingers 56 extend outwardly from the base 52. At least one of the fingers 56a is longer than the remaining fingers 56. In the preferred configuration, only one extended finger 56a is longer than the remaining fingers 56. This extended finger 56a is aligned to extend over and at least partially cover the sensor hole 46 during the sizing process for the first end 40. This provides a surface around one side of the hole 46 that is sized to the first diameter D1. During the sizing process, the actuator 54 moves the fingers 56 radially inwardly toward the center axis A to apply a compressive force F to reduce the outer shell 24 to the specified first diameter D1. Operation of the sizing tool to reduce the outer shell to the desired size is well known and will not be discussed in further detail.

Once the first end 40 has been sized to the first diameter D1, the shell 24 is removed from the tool 50 and the entire assembly is then flipped around for the second sizing process. The second end 42 of the shell 24 is then surrounded by the fingers 56 and is sized to the second diameter D2 based on the measured diameter of the second substrate 30 and weight of the second mat 34. The second end 42 refers to the portion of the outer shell 24 that surrounds at least the second substrate 30. The extended finger 56a is aligned to extend over and at least partially cover the sensor hole 46 during the second sizing process. This provides a surface around an opposite side of the hole 46 that is sized to the second diameter D2, which is greater than the first diameter D1. During the sizing process, the actuator 54 moves the fingers 56 radially inwardly toward the center axis A to reduce the outer shell 24 to the specified second diameter D2.

In another example, the plurality of fingers could comprise a first set of fingers and a second set of fingers, with each of the first and second sets of fingers including at least one extended finger 56a. As such, one set of fingers as shown in FIG. 5 would be positioned at one end of the shell 24 and another set of fingers as shown in FIG. 5 would be positioned at an opposite end of the shell 24. The first end 40 of the outer shell is sized to the first diameter D1 with the first set of fingers, and the second end 42 of the outer shell is sized to the second diameter D2 with the second set of fingers. This embodiment may increase tooling costs as two separate sets of fingers would be required, however, the step of flipping the outer shell around would be eliminated.

In the example shown, as the diameter of the second sizing is greater than the first sizing, the extended finger 56a does not contact the side of the hole 46 that was sized to the first diameter D1 resulting in less deformation. Finally, the sensor boss 48 is then welded to surround the sensor hole 46. The area around the hole 46 still has two different diameters; however, the surface has a better shape for welding than with traditional sizing operations.

The fingers 56 extend axially from the base 52 and are circumferentially spaced apart from each other about the central axis A. The fingers 56 are defined by an axial length L1 that extends from the base 52 to a distal finger end 58. In one example, the axial length L1 extends to a location that is generally at a center of the hole 46. The extended finger 56a has a longer axial length L2 than the other fingers 56. In one example, the longer axial length L2 is configured to extend past the hole 46 by a predetermined minimal length such as 5 mm, for example. The predetermined minimal length will vary dependent upon the converter configuration, size of the substrates, and weight of the mats.

In one example, the distal finger end 58 includes a rounded tip portion 60 that extends beyond the distal end 58 to completely cover the hole 46. In this example, the fingers 56 are all defined by a common width W1 in a circumferential direction. The rounded tip portion 60 does not extend over the entire width W1 of the extended finger 56a such that the extended portion comprising the difference in axial length (L2−L1) comprises a circumferential area surrounding a portion of the hole 56. This provides a process that does not adversely deform the sensor hole 46, and which does not result in too much pressure being applied to the mats 32, 34. Having only one finger 56a extend past the hole 46, as opposed to all fingers extending past, creates a better welding area around the hole 46 and less deformation, as well as avoiding over compression of the mat.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An apparatus for sizing an exhaust component having an outer shell defining a center axis extending from a first shell end to a second shell end, a first substrate positioned within the internal cavity at the first shell end, a second substrate positioned within the internal cavity at the second shell end, and at least one sensor hole formed in the outer shell between the first and second substrates, the apparatus comprising:

a base coupled to an actuator;

a plurality of discrete fingers to surround the first shell end to size the outer shell about the first substrate to a first cross-section and to surround the second shell end to size the outer shell about the second substrate to a second cross-section, wherein the plurality of discrete fingers extend axially from the base and are circumferentially spaced apart from each other about the center axis;

wherein each of the plurality of discrete fingers is defined by an axial length that extends from the base to a distal finger end, wherein the plurality of discrete fingers comprises a first set of fingers and a second set of fingers, each of the first and second sets of fingers including at least one extended finger having a longer axial length than the other fingers, and wherein the first end of the outer shell is sized to the first cross-section with the first set of fingers, and the second end of the outer shell is sized to the second cross-section with the second set of fingers.

2. The apparatus according to claim 1, wherein when the first set of fingers surround the first shell end, the at least one extended finger of the first set of fingers covers the at least one sensor hole.

3. The apparatus according to claim 2, wherein when the second set of fingers surround the second shell end, the at least one extended finger of the second set of fingers covers the at least one sensor hole.

4. The apparatus according to claim 3, wherein the plurality of discrete fingers are moved radially inwardly toward the center axis by the actuator to reduce the first shell end to the first cross-section and to reduce the second shell end to the second cross-section, wherein one of the first and second cross-sections is greater than the other of the first and second cross-sections.

5. The apparatus according to claim 1, wherein the at least one finger of the plurality of discrete fingers comprises only one finger having the longer axial length than the other fingers of the plurality of discrete fingers.

6. The apparatus according to claim 1, wherein the distal finger end includes a rounded tip portion that extends axially beyond the sensor hole.

\* \* \* \* \*

UNITED STATES PATENT AND TRADEMARK OFFICE
CERTIFICATE OF CORRECTION

| | |
|---|---|
| PATENT NO. | : 9,752,476 B2 |
| APPLICATION NO. | : 14/708329 |
| DATED | : September 5, 2017 |
| INVENTOR(S) | : Claudinei Hijazi and John Warren |

It is certified that error appears in the above-identified patent and that said Letters Patent is hereby corrected as shown below:

In the Claims

In Claim 1, Column 6, Line 46; replace "the internal cavity" with --an internal cavity--

In Claim 5, Column 7, Line 19-20; replace "the at least one finger of the plurality of discrete fingers" with --the at least one extended finger of the plurality of discrete fingers--

Signed and Sealed this
Nineteenth Day of December, 2023

Katherine Kelly Vidal
*Director of the United States Patent and Trademark Office*